Oct. 6, 1936.     H. C. BRIDGES     2,056,503
AUTOMATIC AUTO GLASS CLEANING ATTACHMENT
Filed July 30, 1932
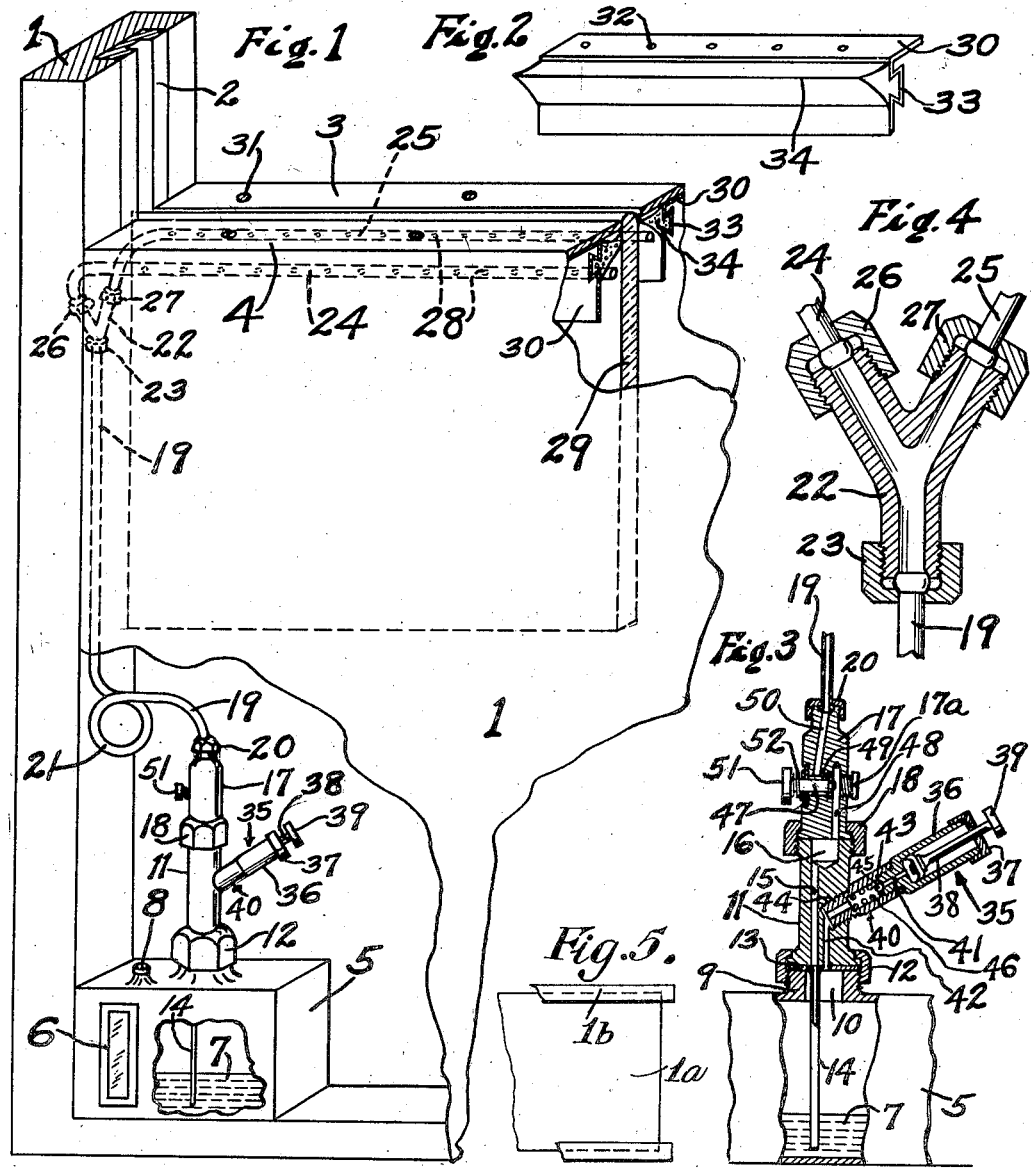
INVENTOR
by HALLIE CAWREY BRIDGES
John A. McHowell
her atty.

Patented Oct. 6, 1936

2,056,503

UNITED STATES PATENT OFFICE 2,056,503

AUTOMATIC AUTO GLASS CLEANING ATTACHMENT

Hallie Cawrey Bridges, Long Beach, Calif.

Application July 30, 1932, Serial No. 626,330

2 Claims. (Cl. 20—40.5)

An object of this invention is to clean the surface of the glass in the car doors and windshield of an automobile.

Another object of this invention is to provide an automatice cleaning attachment which will be simple in construction, simple and positive in operation and which will furthermore, be of a decorative nature so as not to detract from the attractiveness of the vehicle to which it is attached.

Advantages incident to the invention are ease and facility in the operation of cleaning attachments, and method of spraying the glass by air pressure.

A further object of the invention is to provide a device of such character which may be easily operated and which will discharge upon the surface of the glass a measured amount of cleaning fluid or other suitable liquid.

Changes in the form, proportions and minor details of construction may be made within the scope of the claims without departing from the spirit of the invention.

Other objects, advantages and features of invention may appear from the accompanying drawing, the subjoined detailed description and the appended claims.

The accompanying drawing illustrates the invention.

Figure 1 is a fragmental exaggerated perspective view of the invention as applied to a fragment of an automobile door showing the glass in lowered position.

Fig. 2 is a perspective detail view on a small scale showing one of the wiper frames with the rubber wiper fixed therein.

Fig. 3 is an enlarged fragmental sectional view showing the fluid feed valve, air pump and a fragment of the fluid container tank.

Fig. 4 is an enlarged fragmental sectional detail view of the Y connection.

Fig. 5 is a fragmental detail view of a sliding door constructed in the door of the car that permits access to the container tank and pump.

1 designates an automobile door which is of the closed top type and only such portion thereof illustrated as required to locate the cleaning device of my invention. The glass guide 2 and window sills 3 and 4 of the automobile door are, or may be of any approved construction.

The container tank 5 is so constructed and arranged to fit snugly in the bottom of the automobile door as shown in Fig. 1 and is provided with a glass sight 6 so that the amount of fluid 7 can be determined at all times in the container.

To fill the container with cleaning fluid a filler cap is provided as at 8 that is easily removed to fill and then replace. A sliding door 1a is provided, a fragment of which is shown, that slides in slide ways 1b to allow access to the glass sight and container tank.

The container tank 5 is provided on its top with a threaded boss 9 projecting upwardly and having a bore 10 therein.

An air pressure housing 11 fixed to said threaded boss 9 by a connecting nut 12 and interposed between the air pressure housing 11 and threaded boss 9 is a metal washer 13 provided with a downwardly extending fluid tube 14 that permits the fluid 7 to flow upwardly therein when forced by air pressure from the container.

Connecting up with the fluid tube 14 is a vertical bore 15 that passes through the length of the pressure housing 11 into a larger chamber 16.

A pressure control housing 17 is fixed to and directly above the air pressure housing 11 by the coupling 18 and at its top is fixed to the feed tube 19 by the coupling nut 20 and a coil 21 is shown in the tube 19 to take care of vibration.

At the top end of the feed tube 19 is connected a Y connection 22 by the coupling nut 23 and fixed to the Y connection at its forked end are the spray nozzles 24 and 25 by the couplings 26 and 27.

The spray nozzles 24 and 25 are provided with a plurality of holes 28 through which the fluid is sprayed upon the glass window 29.

30 indicates a wiper frame of which there are two constructed and fixed to the window sills 3 and 4 by the screws 31 as shown in Fig. 1 of the drawing.

The wiper frame is provided with holes 32 and a groove 33 into which is fitted the rubber wiper 34 which can be replaced when worn by inserting a new wiper.

There are two rubber wipers required for each car window and fixed on each side of the window glass so that they will always press against the surface of the glass when the window is being raised or lowered.

An air pressure pump is shown as at 35 and comprises a housing 36 and a cap 37 with a plunger 38 extending therethrough having a knob 39 so that the operator may grasp it to force air into the check valve 40 through the orifice 41 on into the channel 42 into the container tank 5.

The check valve housing 43 is screwed into the air pressure housing 11 at an angle as shown at 44 and the check valve comprises a valve ball 45 held in place by the valve spring 46 to prevent any air from escaping from the container tank 5.

In the fluid control housing 17 is provided a pressure release valve 47 which releases fluid to the wiper to be sprayed through the spray nozzles 24 and 25.

Said fluid is fed through from the chamber 16 to a vertical bore 48 to the pressure control chamber 49 into the orifice 50 which connects directly to the feed tube 19.

To operate the fluid release valve 47 the thumb knob 51 is pushed inward which allows the fluid to flow into the orifice 50 from the bore 48, then the valve is released and the spring 52 will close the valve automatically.

I claim:

1. A device of the character set forth for cleaning window glass in an automobile comprising a container tank in the door; a pressure housing connected at the top of said container tank having a force pressure pump and a fluid feed pipe connected to and extending upwardly from said pressure housing; a connection being mounted at the top of said fluid feed pipe having a fluid spray on each side of the glass so that the glass is cleaned when raised and lowered.

2. A device of the character set forth for cleaning window glass in an automobile comprising a container tank in the door; a pressure housing connected at the top of said container tank and a fluid feed pipe connected to and extending upwardly from said pressure housing; a connection being mounted at the top of said fluid feed pipe having a fluid spray extending on each side of the window glass to clean the glass when it is raised and lowered; said pressure housing having a check valve that regulates the flow of fluid to said spray and a force pressure pump that forces air into said container tank.

HALLIE CAWREY BRIDGES.